J. J. BERRIGAN.
ART OF FILTERING MATERIALS.
APPLICATION FILED DEC. 8, 1915.

1,350,292.

Patented Aug. 24, 1920.
4 SHEETS—SHEET 3.

Inventor:
John J. Berrigan
by his Attys.

J. J. BERRIGAN.
ART OF FILTERING MATERIALS.
APPLICATION FILED DEC. 8, 1915.

1,350,292.

Patented Aug. 24, 1920.
4 SHEETS—SHEET 4.

Inventor:
John J. Berrigan
by his Attys:

UNITED STATES PATENT OFFICE.

JOHN J. BERRIGAN, OF ORANGE, NEW JERSEY, ASSIGNOR TO HENRY R. WORTHINGTON, OF NEW YORK, N. Y., A CORPORATION OF NEW JERSEY.

ART OF FILTERING MATERIALS.

1,350,292.  Specification of Letters Patent.  Patented Aug. 24, 1920.

Application filed December 8, 1915. Serial No. 65,652.

*To all whom it may concern:*

Be it known that I, JOHN J. BERRIGAN, a citizen of the United States, residing at Orange, county of Essex, and State of New Jersey, have invented certain new and useful Improvements in the Art of Filtering Materials, fully described and represented in the following specification and the accompanying drawings, forming a part of the same.

The invention relates to improvements in the art of filtering materials.

The invention will first be described in connection with the accompanying drawings, and then particularly pointed out.

In the filtration or filter pressing of many substances particularly sugar liquors, it is customary to employ filter devices comprising filter cloths through which the filtrate passes while the sediment is held back by the cloth. Such sediment generally accumulates on the cloth and at first forms a layer which gradually chokes the flow of filtrate through the filter device. As this sediment usually adheres quite firmly to the cloth, it is customary either to open the apparatus and clean the filter, or by suitable mechanical or other means to brush, scrape, shake or wash off the sediment, which drops to the bottom of the apparatus and is removed therefrom by suitable means.

One important feature of the present invention consists in a method of and an apparatus for preventing or reducing the adhesion of such adhesive sedimentary material, so that it will not adhere to the cloth or filter material, or at least will not adhere sufficiently to form an obstructing layer.

In carrying out the method the desired result is attained by supplying a fluid to the interior of the hollow filter element during the filtering operation, so that as the sediment tends to accumulate on the outside of the filter element, its adhesiveness is counteracted and it either falls at once from the filter surface, or falls therefrom so soon as it has accumulated to an extent so slight as to be insufficient to materially obstruct the passage of the filtrate.

In an apparatus embodying the preferred form of the invention, each filter element is of such a construction as to provide an interior compartment at least one of the walls of which, and generally both, constitutes a filter, this interior compartment being provided with an outlet as usual and also with an inlet for admission of the fluid whose function is to counteract the adhesiveness of the sediment which deposits on the outside of the filter element.

The invention is particularly applicable to the filtration of sugar liquors, because these give sediments which are quite adhesive and tend to cling with considerable tenacity to the filter cloths on the outside of the filter elements, so that a layer of sediment is rapidly built up to such a thickness that it materially obstructs the passage of the filtrate to the interior of the filter element.

It has been found that if, with such liquids, steam is admitted continuously to the interior compartment of the filter during the filtering operation, the surplus steam or water of condensation passing off with the filtrate, the sediment deposited on the outside of the filter cloths does not adhere to an extent sufficient to clog the filter but drops off by its own weight and may be removed from the apparatus. This may be due to the heat of the steam, or to the pressure of the latter outward, or to both. Whatever the reason the action is very advantageous.

A further important feature of the invention consists in providing means for compacting this sediment prior to its removal from the apparatus, whereby any liquid mixed with it may be squeezed out to a considerable extent, so that the sediment may be removed in a relatively solid condition.

Another important feature of the invention consists in a method of and apparatus for washing the sediment while under pressure and in a considerably compacted condition, the wash liquor being returned to the filter. By this method the sediment is washed under pressure while in a restricted space, so that the water or other washing fluid is driven into the compact material, and the latter can be washed with a small amount of wash liquor or fluid, so that the sediment is not diluted unnecessarily. The apparatus for carrying out this process is advantageously such that, after the washing, the sediment may be compacted as hereinbefore explained, thereby squeezing out any remaining surplus of wash liquor. Thus the sediment removed from the apparatus is in a well washed but undiluted condition.

In Figs. 1 to 6 I have illustrated a filtering apparatus which, by the removal of certain parts, as more fully described hereinafter, can be used as a gravity or hydraulic press of the type disclosed in my Patent No. 1,130,879.

With an apparatus of this kind, it is possible to open the filter readily, and in such a way as to have convenient access to the filter elements which may be easily removed and replaced. In such a construction the platens of the press constitute side walls for a casing to contain the filtering elements, the top, bottom and end walls of this casing forming a frame, which, in the best embodiment of the invention, is supported from the said platens and in such a way that a relative movement of the casing and the platens is permitted. Owing to the fact that the press is power-operated in the direction of opening and may be closed by gravity, it is practicable to use relatively large filter elements and yet handle the apparatus in a rapid and convenient manner, so that a larger filtering area may be obtained with relatively fewer filtering elements than in the previous types of filters. Owing to this reduction in the number of filtering elements for a given filtering area, the removal and replacement of the elements may be done more conveniently and more rapidly than in such prior types.

I will now specifically describe the embodiment of the filter shown in Figs. 1 to 6. At 1 and 1ª, respectively, are indicated the coöperating platens which in the present invention serve as side walls of the filter casing. These platens are provided at each end with horizontally projecting trunnions 11 and each trunnion is journaled in one end of a link, as indicated at 12, each link being fulcrumed in a suitable boxing or fulcrum device, as indicated at 13. These boxings or fulcrum devices are mounted on suitable pedestals 14 secured to a base 15. The boxings of each pair are adjustable toward and from each other by tension rods 17 having suitable nuts.

At 20 is indicated a cylinder provided with a piston 21, and piston rod 22 whose head 23ª is pivotally connected to links 23, each of which is pivotally connected to its respective arm 24, carried by the levers 12. Preferably, each end of the apparatus is provided with such a cylinder, piston and connecting parts. Means is provided for supplying fluid under pressure to each end of each cylinder and for regulating and controlling the discharge therefrom. All of this press mechanism is fully described in Patent No. 1,130,879, to which reference may be had for details.

Figure 3:
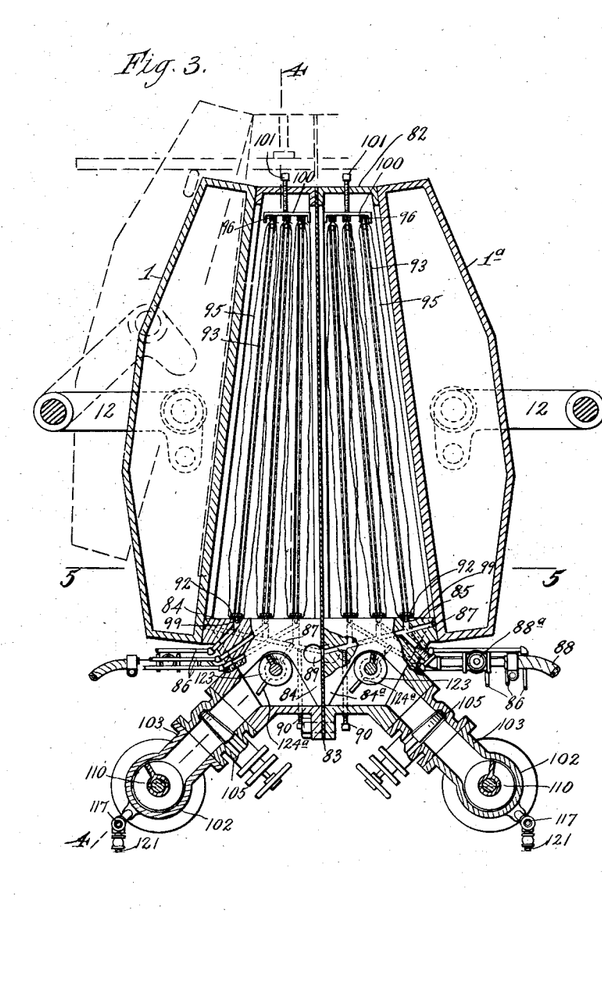
Fig. 3 a detail transverse section on a large scale, taken on the line 3—3, Fig. 1.

Coming now to the additional elements of the present construction, it will be seen that with the platens in a raised and therefore separated position, the space between the platen faces is occupied by a filter casing 82, in the present example formed in two parts joined along a vertical line with a diaphragm 83 between them, so that in this embodiment of the invention two filter chambers are formed. The bottom of each chamber is formed as a trough, as shown in Fig. 3. Transversely of the trough portions and intermediate the ends are arranged two pairs of bearing members 84, 84ª, 85, 85ª, the bearing members of a pair being in alinement with each other. Each bearing member is provided with a plurality of upwardly opening ducts equal in number to the number of filtering elements in each chamber.

The bearing members 84 and 85ª—that is to say the respectively opposite members of the two pairs—have the ducts connected to individual pipes, as indicated at 86, Fig. 3, each pipe being provided with a valve. The other two bearing members, 84ª and 85 have their upwardly opening ducts connected to a common passage, as indicated at 87, Fig. 3, which common passage is arranged to be supplied with a wash-out fluid, such as water or steam, by means of a pipe 88, provided with a valve 88ª. Also, this common passage extends through the partition 83, where it opens into a transverse port 89 in the correspondingly opposite bearing member, so that in this way liquor entering the respective passages 87 can be permitted to flow to the adjacent filter chamber, for a purpose hereinafter explained. Suitable means is provided for closing this communication between the two filter chambers, as for example, by providing a screw-plug 90, whose head is outside the filter and whose inner end is arranged to serve as a valve or closure for shutting the respective passages.

Figure 2:
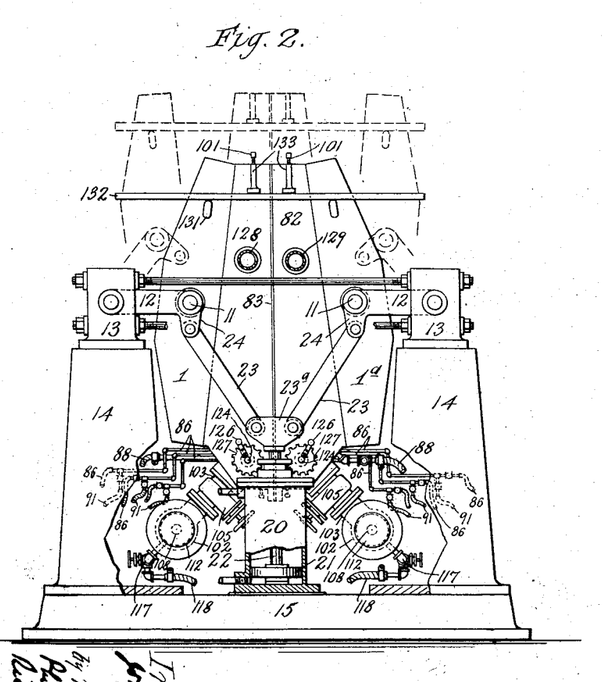
Fig. 2 an end elevation of the same.

The pipes 86 are provided with means for admitting steam to them, as for example, the series of individual steam pipes, indicated at 91, Fig. 2, each having a valve, as shown.

Figure 4:
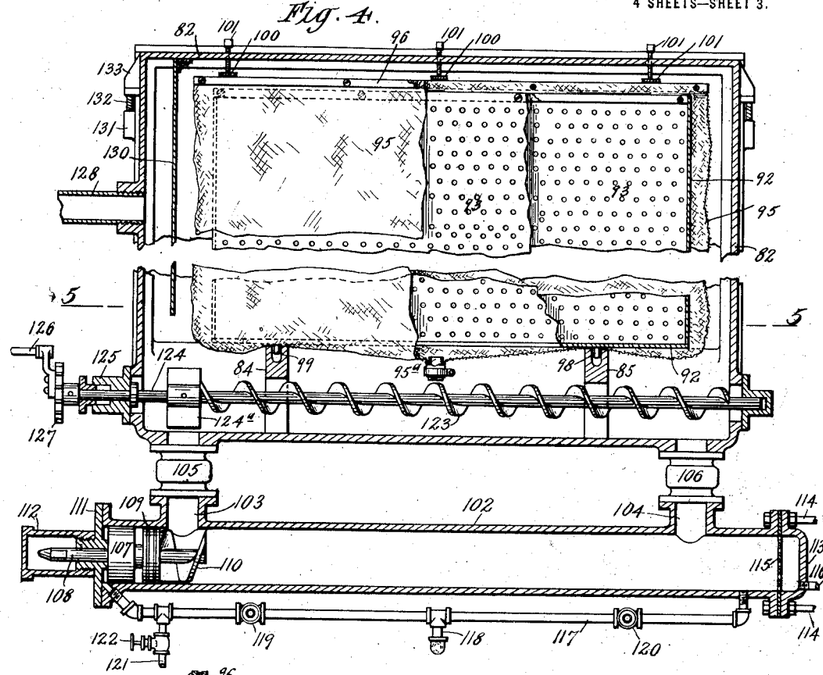
Fig. 4 a longitudinal section on the line 4—4, Fig. 3.
Figure 5:
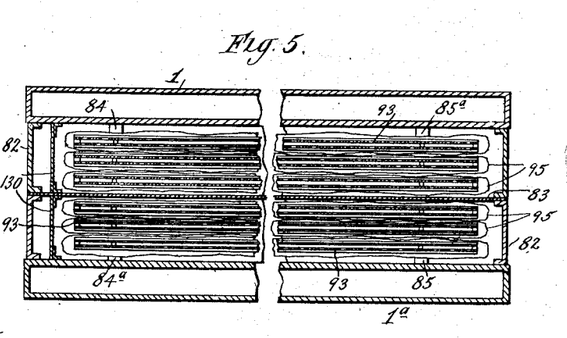
Fig. 5 a horizontal section on the line 5—5, Fig. 4.
Figure 6:
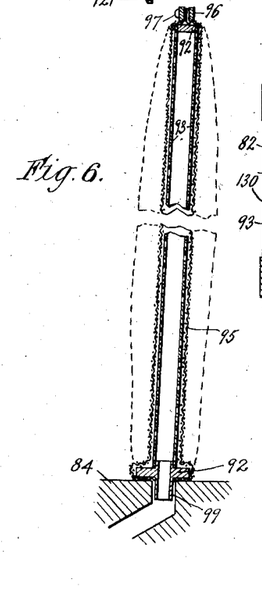
Fig. 6 a detail section of one of the filter devices and its bearing member.

The filter elements may be of any suitable construction, but in the best embodiment of the invention shown in the drawings, each comprises a rectangular frame, for example, of iron or steel, indicated at 92, having sides 93 of perforated sheet metal, outside of which may be placed wire gauze. The frame with its sides is inclosed in a suitable loose bag 95 of filter cloth, whose upper edges are clamped together by strips 96 held together by screws 97, (see Fig. 6). The bottom of the frame is provided with inlet and outlet devices which are arranged to extend through holes in the bottom of the bag and into the corresponding upwardly opening ducts in the bearing members. In the present instance these inlet and outlet devices consist of short nipples, indicated at 98 and 99, Fig. 4, these nipples having shoulders, as shown in Fig. 6. In order that the bag may be cleaned of any sediment, it may be provided with a capped nozzle 95ª held in place by a draw-band, as shown in Fig. 4.

The filter devices are held in close contact with the bearing members by suitable means, as for example, by providing a cap 100, Fig. 3, to cover all the filter devices of a chamber and providing screws 101 to force the caps downward. These screws are threaded through the top of the chamber.

Below the filter, suitable means is provided for pressing and washing the sediment. In the present example one such means is provided for each filter chamber, each consisting of a drum 102, Fig. 4, connected to each end of the bottom of the respective chambers by a suitable passage 103, 104, each controlled by a gate valve, 105, 106.

Each drum is provided with suitable means for applying pressure to the sediment to compact it. In the present example, the drum is arranged to serve as a cylinder and contains a piston device comprising a piston 107, within which is rotatably mounted a spindle 108, whose outer end is tapered or coned as shown in Fig. 4, and whose inner end carries a disk 109, from which projects a screw device 110 for a purpose hereinafter explained.

The drum has one end provided with a head 111 having a boss provided with an opening through which the spindle 108 may project, the outer end of the boss being threaded to receive a cap 112.

The arrangement of the parts is such that the screw device 110 will be beneath the passage 103, when the piston device is in its extreme position at the corresponding end of the drum, as shown in Fig. 4. The opposite end of the drum has a detachable cap 113 held by long bolts 114 and nuts, whereby when the cap is loosened it may be slid out a short distance from the drum and still be supported by said bolts. Over this end of the drum is placed a suitable strainer device such as the perforated sheet metal diaphragm 115, which is held in place between the flange of the drum and that of the head 113. The head is domed to provide a chamber outside the diaphragm 115 and is tapped to receive a pipe 116 serving as an outlet for liquor, this pipe being controlled by a suitable valve.

Means is provided for supplying fluid under pressure to each end of the drum. In the present example, each end of the drum is connected to a pipe system 117 which is united, at a point intermediate its ends, to a water supply pipe, indicated at 118. At each side of this water supply pipe, the pipe system is provided with a valve, as shown at 119 and 120. In addition, the pipe system is connected at one end to a steam supply pipe 121, controlled by a valve 122.

In the present construction, the trough bottom of each filter chamber is provided with means which may serve to agitate the contents of said chamber, and this agitating means, in the best embodiment of the invention, is arranged so that it may also serve as a conveying device. As illustrated in Fig. 4, this agitating and conveying means is formed as a spiral conveyer 123, having its spindle 124 suitably journaled in the filter casing, one end of the spindle projecting through a packing gland 125, and being provided with suitable means for operating it. As shown, the projecting spindle is provided with a hand crank 126 and a chain wheel 127. The conveyer spindle has a scraper blade 124ª opposite the passage 103.

Figure 1:
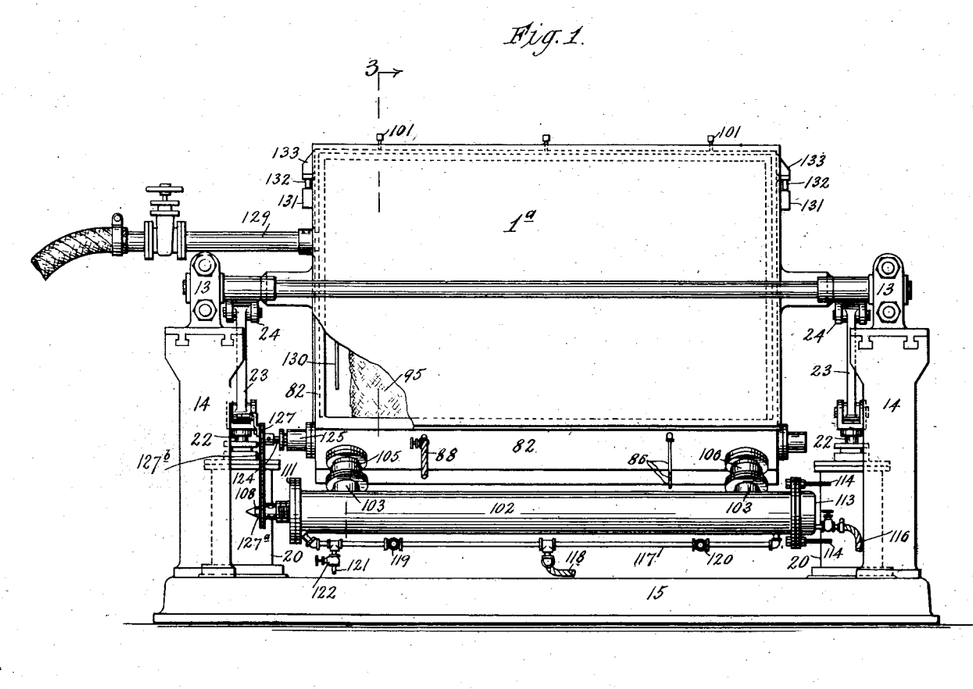
Figure 1 is a side elevation, partly broken away, of an apparatus embodying one form of the invention.

By removing the cap 112 and placing a chain wheel, 127ª, on the end of the spindle 108, which is shown as squared to receive such a chain wheel, a chain 127ᵇ, Fig. 1, may be passed over the two chain wheels, so that rotation of the conveyer spindle 124 by the hand-crank may also rotate the spindle 108.

The filter casing is provided with suitable means for supplying material to each filter chamber outside the filter elements therein. In the present example, the casing has holes threaded to receive supply pipes 128 and 129, Fig. 2, these holes being arranged at one end of the casing and at each side of the partition 83, so that one pipe may supply material to one filter chamber and the other to the adjacent filter chamber. Suitable valves 128ª, 129ª, may be used to control the supply pipes. In order to insure the delivery of the material directly to the bottom of the filter chambers, suitable baffle devices may be employed, as for example, the depending baffle plates 130, Fig. 4, attached to the inside of the top plates of the casing and extending transversely of the chambers to nearly the bottoms thereof.

For the purpose of suitably supporting the filter casing and its attached parts, each end of each platen is provided near its upper end with outward projecting lugs 131, Fig. 2. On each pair of lugs at the same end of the filter is supported a hanger-bar 132. The filter casing is provided at each end with a pair of supporting brackets 133, which rest upon the corresponding hanger-bars 132. In this way the casing is supported from the platens and at the same time a relative movement of the platens and casing is permitted, as will be understood from the dotted lines in Figs. 2 and 3.

The apparatus may be operated with its filter chambers in parallel, that is, each serving as an independently working filter, or with its chambers in series, so that the filtrate from one chamber will pass into the other filter chamber and then out through the filter elements thereof. In the former case both of the screw-plugs 90 are closed. In this condition the operation of the apparatus is as follows:

The material to be filtered, which, as usual, comprises liquid and solids in suspension, is delivered to the filter chambers through the supply pipes 128, 129, and after passing first to the bottom of the chambers, then rises and fills the same. The filtrate passes through the filter walls to the interior of each filter compartment and flows off through the respective outlets 86, while solids are held back on the outside of each filter element. In the prior practice these solids generally could cling to the filter cloth and gradually build up a layer of solids which would slow down and finally practically stop the filtering operation. My filter may be operated in the same way, and the layer of solids may be permitted to build up to any desired extent. In order then to shake the sedimentary layers loose from the outer surfaces of the filter elements, a counter-current of fluid, such as steam or water, may be sent into the interior of the filtering elements, as for example, by closing the valves of the individual outlets 86 from the filter elements and admitting fluid to the passages 87, as for example, by opening the valves 88ª and admitting steam. This fluid tends to escape through the pores of the cloth and thereby loosens the sediment and also tends to shake the sediment loose by distending the bag as shown in Fig. 6. By suitably manipulating the steam valves to suddenly turn the steam on and off, the bag may be shaken, thus insuring that it will be freed of sediment.

However, when filtering some kinds of material, as for example, sugar liquors, steam may be continuously supplied to the interior of the filter elements during the filtering operation by opening the steam valves as soon as the filter chambers have been filled with liquor. The steam enters through the inlet 98 at the bottom of each filter frame and after circulating within the filter compartment passes out through the outlet 99 with the filtrate, either as steam or as water of condensation.

The steam has the effect of rendering the sediment on the outside of the filter less adhesive, so that an obstructive layer is not formed. The sediment falls of its own weight from the filter cloth.

When the filter chambers are to work in series, it is customary to provide the filter elements which first filter the liquor with coarser filter bags than those in the other chamber. For purpose of explanation, it will be assumed that the right hand chamber, Fig. 3, has the coarser cloth. In this case the passage 87 is opened to the other chamber by unscrewing the corresponding screw-plug 90 to the necessary extent. The individual outlets of the filter elements in this right hand chamber are closed by closing the valves of such outlets.

The right hand chamber is then filled with material to be filtered from the supply pipe 129, the other chamber being empty at the beginning.

The filtrate passes through the filter cloths, leaving the sediment behind and escapes from the individual filter elements to the common passage 87 of the right hand chamber and adjacent filter chamber, where it then passes through the filter cloths of that chamber, and finally escapes through the individual outlets thereof. If it is desired to employ steam during the filtering operation to prevent the sediment from clinging to the cloths, the steam may be admitted to the interior of the filter elements in the right hand filter chamber by opening the steam valves of the pipes 91, and to the interior of the filter elements in the left hand filter chamber by opening the valves 88ª of the left hand chamber.

If, however, the cloths are allowed to accumulate sediment to a given extent, and then are to be cleaned by a counter current of steam, the steam valves may remain closed during the filtering operation and then when the cloths are clogged, the steam may be turned on to remove the sediment, which drops to the bottom of the filter chambers.

If it is desired to send the liquor through the left hand chamber first and the filtrate therefrom through the right hand chamber, the screw-plug 90 of the left hand chamber is unscrewed to open the corresponding passage 87, and the plug 90 of the right hand chamber is screwed up to close its passage 87.

If at any time it is desired to agitate the material in the filter chambers, the screw conveyers 123 may be turned by operating the cranks 126, turning first in one direction and then in the other.

When it is desired to remove the sediment from a filter chamber, the valve 105 is opened and the corresponding conveyer turned in such a direction as to convey or draw all the sediment toward its passage 103, down which the sediment falls to the respective drum 102. When filling the drum, the cap 112 is removed, a chain wheel is applied to the spindle 108, and a chain put around this chain wheel and around the chain wheel 127. Then as the hand-crank 126 is turned to operate the conveyer 123 in the filter chamber, the screw 110 in the drum is rotated in a direction to drive the sediment into the drum.

When a sufficient amount of sediment has been supplied to the drum, the valve 105 is closed and the sediment may be compacted to squeeze out the liquor which has come down with it by opening the valve in the outlet pipe 116 and admitting fluid pressure behind the piston 107. If steam is to be used for this purpose, the valve 122 is opened, but if water is desired, the valve 119 may be opened. In this way the piston 107 is driven toward the opposite end of the drum and the sediment is squeezed against the perforated diaphragm 115, the liquor squeezed from the sediment escaping through the diaphragm 115 and through the outlet 116.

In order to wash this compacted sediment to free it completely from liquor, the valve 116 is closed and water is admitted behind the piston to force the latter tightly against the compacted sediment. Then the valve 120 is opened to admit water in front of the piston and into contact with the compacted sediment. The valve 119 is then closed to shut off the water behind the piston, and a small amount of the water trapped therein is allowed to escape, as for example by opening the drip cock 117ª. This permits the piston to be forced back to a limited extent, whereupon the drip cock may be closed. The pressure of water in front of the piston causes the water to enter all the pores of the compacted sediment, thus insuring that it will be well penetrated by the wash water. The valve 106 may then be opened slightly to allow the surplus water and any sediment it may carry to enter the filter compartment. After the proper washing in this way, the valve 106 may again be closed, the water supply to the front of the piston cut off, the outlet valve 116 opened, and the water pressure again admitted behind the piston to again compact the cake and squeeze out the wash liquor. Then the water pressure behind the piston may be cut off, the domed head 113 loosened and slid out, and the piston again moved by admitting water pressure behind it to drive the compacted material out through the outer end of the drum.

On replacing the head 113, the piston may be driven back to its normal position, and the apparatus again set in condition for further sediment collection.

If, in filling the drum with sediment, any difficulty is found in getting the sediment from the bottom of the filter chamber, the valve 106 may be fully opened and the piston 107 moved forward by opening the water valve 119. Then by allowing the water to escape quickly from behind the piston, the latter is driven backward quickly by the pressure of liquor in the filter chamber, whereby sediment is quickly drawn into the drum by the inflowing liquor.

If at any time it becomes necessary to obtain access to the interior of the filter chambers to remove and replace or clean the filter elements, the press platens 1 and 1ª and the filter casing may be lifted by the admission of fluid pressure below the press pistons 21, whereby the parts assume the position shown in dotted lines in Fig. 2, and, if necessary, the platens may be swung readily to the positions shown in dotted lines in Fig. 3.

In Figs. 7, 8, 9 and 10, I have illustrated a modification of the invention whereby a combined filtering and pressing apparatus results.

In this modification the filter elements are not used and the casing has its outer walls or sides formed of loose filter material, each clamped in place by a frame 140 screwed to the edge of the casing forming the filter chambers.

The platens are provided with means which may be called plunger devices, since they are arranged to fit snugly into the opening of the filter chambers to compress material therein. Each of these plunger devices comprises a block 141 secured to the respective platens 1, 1ª, and provided on its pressing face with a perforated plate 142, between which and the block 141 is a suitable supporting and draining device such as the corrugated sheet of metal indicated at 143.

Figure 7:
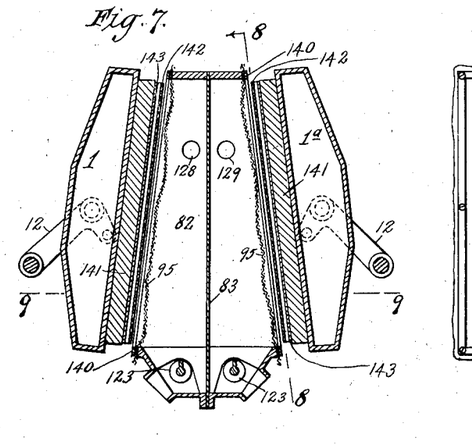
Fig. 7 a detail section of a modification of the apparatus useful for filter pressing.
Figure 8:
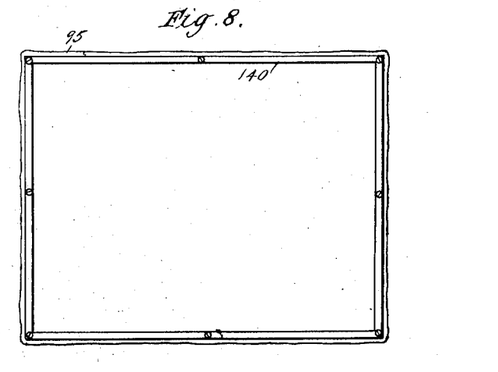
Fig. 8 a section on the line 8—8, Fig. 7.
Figure 9:
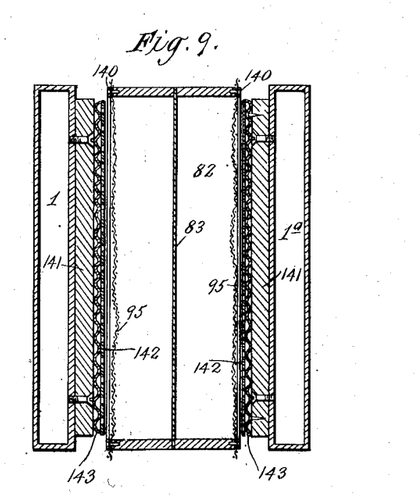
Fig. 9 a section on the line 9—9, Fig. 7.
Figure 10:
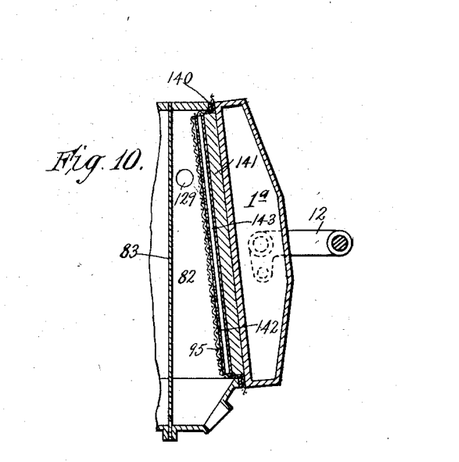
Fig. 10 a detail section showing the parts in a different position.

In this device the material to be filtered and pressed, usually a semi-liquid mass, is forced into the filter chambers through the supply openings 128, 129. At the beginning the press platens are lifted, so that the pressing faces are just outside the filter chambers, as shown in Fig. 7. In this position, the liquid from the material inside the chambers will be filtered through the side filters and the chambers will gradually fill up with sediment. When a sufficient amount has accumulated, the platens and casing may be allowed to sink gradually, thus moving the platens toward each other to squeeze the sediment, the liquid therefrom escaping through the drainage chambers formed in the plunger devices. The position of the platens at the end of the squeezing operation will be clear from Fig. 10.

It is to be understood that although in the filter shown in Figs. 1 to 6, a screw conveyer is employed to assist in removing the sediment from the bottom of the filter casing, such a conveyer may be dispensed with. In such case the trough bottom of the filter bottoms may, if desired, be sloped in the direction of their length toward the outlet passage, as for example, the passage 103. Also, suitable means may be provided whereby the sediment along this inclined bottom can be washed toward the outlet. To accomplish this, it is only necessary to provide a water inlet at the end of the casing away from said outlet passage. Furthermore, if desired, suitable scraping means may be employed to assist in removing the sediment.

An important feature of my improved filter is that the material to be filtered is supplied to the filter casing in such a manner that it is first directed toward the bottom before coming into contact with the filter elements and then tends to travel in the direction of the length of the filter elements from one end to the other. As a consequence of this, if the material to be filtered carries any solids which readily precipitate, this precipitation will tend to take place along the bottom of the filter chamber, thereby avoiding the deposit of such solids on the filter elements themselves.

What I claim is:

1. In a filter, the combination, with a casing, a hollow filter element supported therein and comprising walls of filter cloth, and means for conducting material to be filtered to the interior of the casing, of means for conducting away filtrate from the interior of the hollow filter element, and means for supplying a heated fluid to the interior of said filter element while the filtration is in progress.

2. In a filter, the combination, with a casing, a hollow filter element supported therein and comprising walls of filter cloth, and means for supplying material to be filtered to the casing, of means for conducting steam to the interior of the hollow filter element, and means for conducting away condensed steam and filtrate from the interior of the hollow filter element.

3. In a filter, the combination, with a filter casing, two bearing members located therein and each provided with a plurality of upwardly opening ducts, of individual pipe connections to each of said ducts of one bearing member, a common connection to the plurality of ducts of the other bearing member, a plurality of filtering elements having openings in their bottoms arranged to register with the corresponding ducts in the bearing members, and means for holding said filter elements in contact with the bearing members.

4. In a filter, the combination, with a filter casing, two bearing members located therein and each provided with a plurality of upwardly opening ducts, of a series of vertically arranged filter elements spaced apart from one another and carried by the pair of bearing members, each filter element having a pair of openings in its bottom, one opening being arranged to register with its respective duct in one of the bearing members and the other opening arranged to register with a corresponding duct of the other bearing members, means for supplying steam to the ducts of one bearing member, means for conducting away filtrate from the ducts of the other bearing member, and means for holding the filter elements against the bearing members.

5. In a filter, the combination, with a filter casing, and a bearing member having a plurality of upwardly opening ducts, of a series of vertically arranged independent filter elements within the casing, each provided with an opening in its bottom to register with the corresponding ducts in the bearing member, a cap arranged to rest on top of the filter elements, and means extending through the top of the casing for forcing said cap against the top of the filter elements.

6. In a filter, the combination, with a filter casing, a pair of bearing members, each having a plurality of upwardly opening ducts, of a series of vertically arranged filter elements spaced apart from one another and carried by the pair of bearing members, each filter element having a pair of openings in its bottom, one opening being arranged to register with its respective duct in one of the bearing members and the other opening arranged to register with a corresponding duct of the other bearing member, and means for forcing the filter elements against the bearing members.

7. In a filter, the combination, with a filter casing, a pair of bearing members, each having a plurality of upwardly opening ducts, of a series of vertically arranged filter elements spaced apart from one another and carried by the pair of bearing members, each filter element having a pair of openings in its bottom, one opening being arranged to register with its respective duct in one of the bearing members and the other opening arranged to register with a corresponding duct of the other bearing member, a cap arranged to rest on top of the filter elements, and means extending through the top of the casing for forcing said cap against the filter elements and the latter against the bearing members.

8. In a filter, the combination, with a filter casing, hollow filter elements arranged therein, and means for supplying material to be filtered to the casing outside said filter elements, of means for leading away filtrate from the interior of the filter elements, and means adapted to remove sludge from the filter during the filtering, said means comprising a closed receptacle below the casing and connected therewith to receive sediment from said casing, means for closing the connection between the receptacle and casing, and means for removing sediment from said receptacle.

9. In a filter, the combination, with a filter casing, hollow filter elements arranged therein, and means for supplying material to be filtered to the casing outside said filter elements, of means for leading away filtrate from the interior of the filter elements, and means adapted to remove sludge from the filter during the filtering, said means comprising a closed receptacle below the casing and connected therewith to receive sediment from said casing, said receptacle having a discharge opening closed by a removable cover, means for closing the connection between the receptacle and casing, and means for compacting sediment in said receptacle, said means being arranged to discharge the sediment through the discharge opening when the cover is removed.

10. In a filter, the combination, with a filter casing, hollow filter elements therein, means for supplying material to be filtered to the casing outside said filter elements, and means for leading away filtrate from the interior of said filter elements, of means adapted to remove sludge from the filter during the filtering, said means comprising a closed receptacle for sediment below said casing and connected therewith, means for closing said connection, and means for subjecting sediment in the receptacle while closed to fluid under pressure.

11. In a filter, the combination, with a filter casing, hollow filter elements therein, means for supplying material to be filtered to the casing outside said filter elements, and means for leading away filtrate from the interior of said filter elements, of means adapted to remove sludge from the filter during the filtering, said means comprising a closed receptacle for sediment below said casing and connected therewith, means for closing said connection, means for compacting the sediment, and means for subjecting sediment in the receptacle while closed to fluid under pressure.

12. In a filter, the combination, with a filter casing, hollow filter elements therein, means for supplying material to be filtered to the casing outside said filter elements, and means for leading away filtrate from the interior of said filter elements, of means adapted to remove sludge from the filter during the filtering, said means comprising a closed receptacle for sediment below said casing and connected therewith, means for closing said connection, means for subjecting sediment in said receptacle to fluid under pressure, and means for expanding the sediment-receiving chamber of the receptacle.

13. In a filter, the combination, with a filter casing, hollow filter elements mounted therein, means for supplying material to be filtered to the casing outside of said filter elements, and means for conducting away filtrate from the interior of said filter elements, of means adapted to remove sludge from the filter during the filtering, said means comprising a closed receptacle for sediment beneath the filter casing and connected therewith by a passage, and a rotatable screw located within said receptacle opposite said passage.

14. In a filter, the combination, with a filter casing, hollow filter elements mounted therein, means for supplying material to be filtered to the casing outside of said filter elements, and means for conducting away filtrate from the interior of said filter elements, of means adapted to remove sludge from the filter during the filtering, said means comprising a closed receptacle for sediment beneath the filter casing and connected therewith by a passage, a piston movable within said receptacle, and a rotatable screw device carried by said piston.

15. In a filter, the combination, with a filter casing, hollow filter elements mounted therein, means for supplying material to be filtered to said casing outside the filter elements, and means for conducting away the filtrate from the interior of said filter elements, of a receptacle for sediment below the casing and connected therewith by two passages, means for opening and closing said passages, a piston in said receptacle, and means for supplying pressure fluid to move said piston while one passage is closed and the other open, whereby the material in the casing is agitated and sediment drawn into the receptacle.

16. In a filter, the combination, with a filter casing, hollow filter elements mounted therein, means for supplying material to be filtered to said casing outside said elements, and means for conducting filtrate from the interior of said elements, of a receptacle for sediment below the casing and connected therewith by a passage, a conveyer in the bottom of the casing, a screw in the receptacle opposite said passage, and means for simultaneously operating the conveyer and screw.

17. In a filter, the combination, with a filter casing comprising platens having faces extended in a general upward direction, and arranged to form side closures for said filter casing, of means for swinging the platens upward and outward to separate them from the remainder of the casing, and filter elements movably mounted within said casing.

18. In a filter, the combination, with a filter casing comprising platens having faces extended in a general upward direction, and arranged to form side closures for said filter casing, of means for moving the casing upward and swinging the platens upward and outward to separate them from the remainder of the casing, and filter elements movably mounted within said casing.

19. In a filter, the combination, with a filter casing comprising platens having faces extended in a general upward direction, and arranged to form side closures for said filter casing, of means for moving the casing upward and swinging the platens upward and outward to separate them from the remainder of the casing, filter elements movably mounted within said casing and means for supporting the remainder of said casing from the platens.

20. In a filter, the combination, with a filter casing comprising platens having faces extended in a general upward direction, and arranged to form side closures for said filter casing, of means for moving the casing upward and swinging the platens upward and outward to separate them from the remainder of the casing, filter elements movably mounted within said casing, and outward extending lugs on each end of each platen, a supporting bar at each end of the platens, each bar resting on the corresponding lugs, and means at each end of the remainder of the casing arranged to rest upon the corresponding bars.

21. In a process of filtering, the step which comprises maintaining a body of heated fluid within the filter element during the filtering operation.

22. In a process of filtering, the step which comprises maintaining a body of steam within the filter element during the filtering operation.

23. In a filter, the combination, with a casing, of a plurality of filter elements mounted therein, and means for supplying the material to be filtered to the casing at one end thereof and in a direction toward the bottom of said casing, whereby solids may be precipitated before the arrival of such solids in contact with the filter elements.

24. In a filter, the combination, with a filter casing, of a hollow filter element mounted therein and comprising a frame having perforated sides, a filter cloth surrounding the frame and sides, said cloth passing around the bottom thereof, and clamps for clamping the unsecured edges of the cloth together.

25. In a filter, the combination with a filter casing, hollow filter elements therein, means for supplying material to be filtered to the casing outside said filter elements, and means for leading away filtrate from the interior of said filter elements, of means adapted to remove sludge from the filter during the filtering, said means comprising a closed receptacle for sediment below said casing and connected therewith, means for closing said connection, means for subjecting sediment in the receptacle while closed to fluid under pressure, a second connection between said casing and said receptacle located at the end of the receptacle opposite that of said first connection, and means for closing said second connection.

26. In a filter, the combination with a filter casing, hollow filter elements mounted therein, means for supplying material to be filtered to the casing outside said filter elements, and means for conducting away filtrate from the interior of said filter elements, of means adapted to remove sludge from the filter during the filtering, said means comprising a closed receptacle for sediment beneath the filter casing and connected therewith, means for closing said connection, a piston longitudinally movable within said casing, a rotatable screw device carried by said piston, and means for admitting fluid under pressure at each end of said receptacle.

In testimony whereof, I have hereunto set my hand, in the presence of two subscribing witnesses.

JOHN J. BERRIGAN.

Witnesses:
A. WHITE,
M. C. MASSIE.